No. 815,395. PATENTED MAR. 20, 1906.
H. A. WILLIAMS.
WORKER CYLINDER FOR MACHINES FOR PULLING, TEARING, &c.,
COP WASTE, &c.
APPLICATION FILED APR. 25, 1905.
2 SHEETS—SHEET 2.
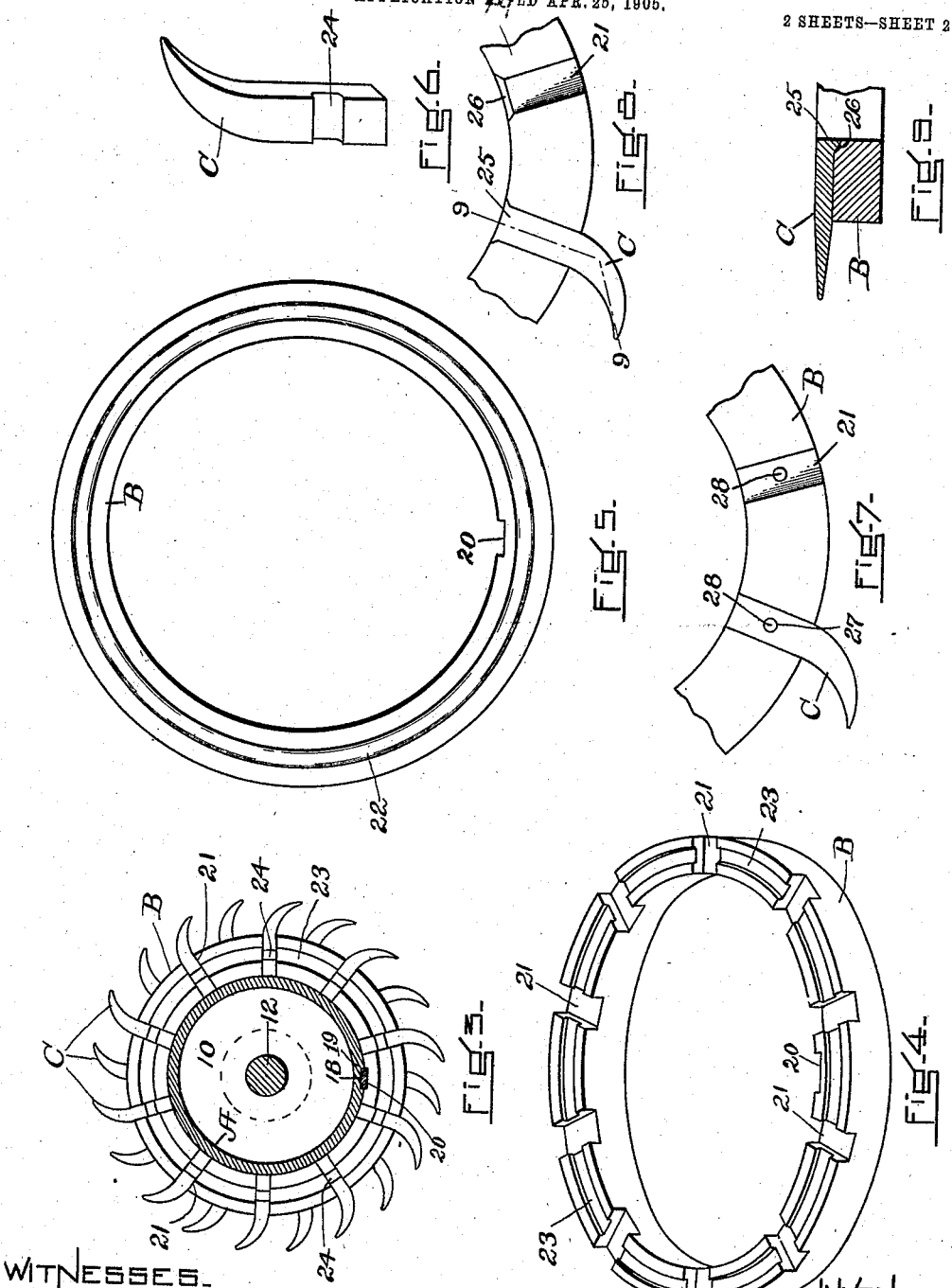

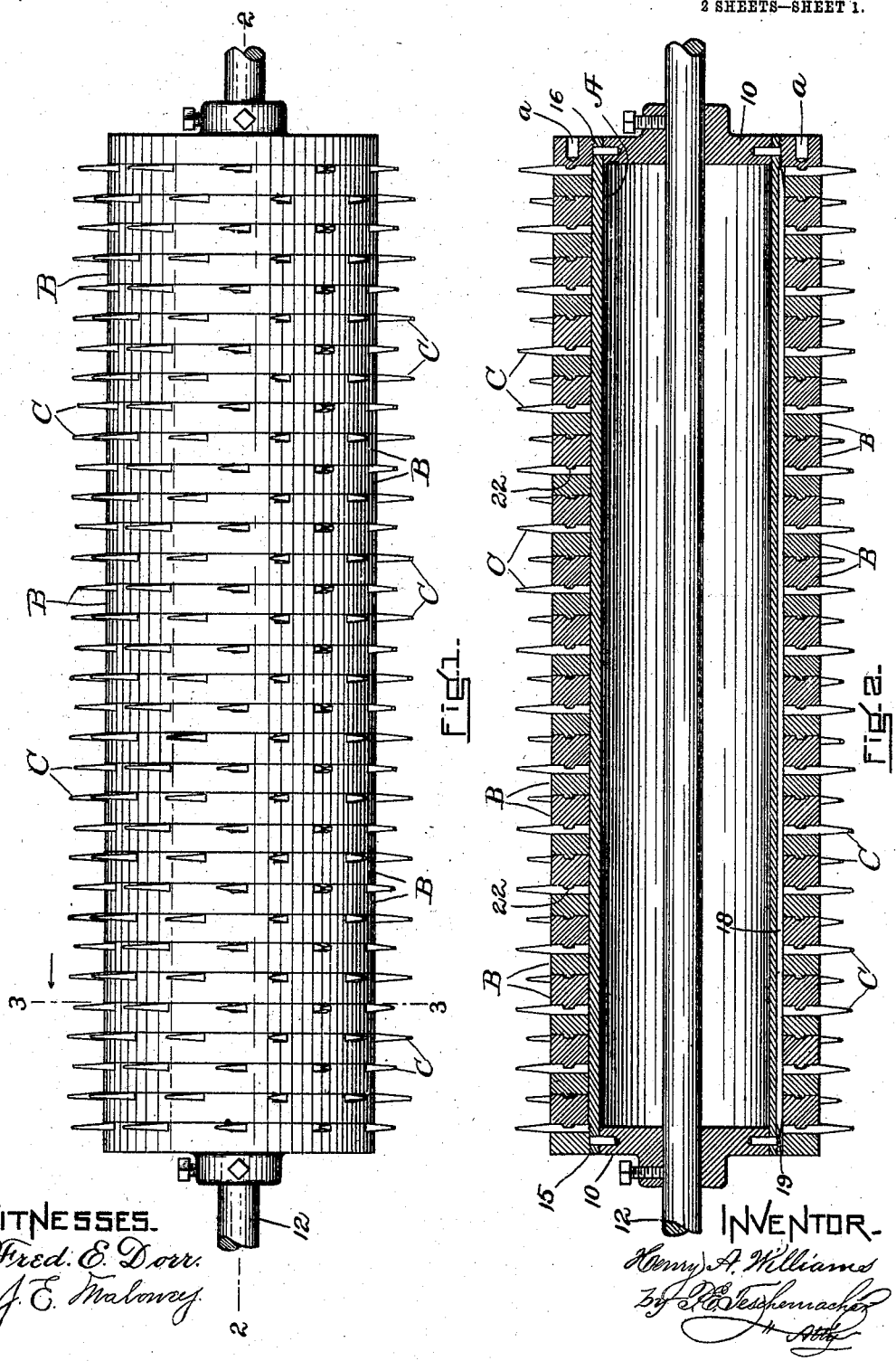

UNITED STATES PATENT OFFICE.

HENRY ALEXIS WILLIAMS, OF WOLLASTON, MASSACHUSETTS.

WORKER-CYLINDER FOR MACHINES FOR PULLING, TEARING, &c., COP-WASTE, &c.

No. 815,395.   Specification of Letters Patent.   Patented March 20, 1906.

Application filed April 25, 1905. Serial No. 257,366.

*To all whom it may concern:*

Be it known that I, HENRY ALEXIS WILLIAMS, a citizen of the United States, residing at Wollaston, in the county of Norfolk and State of Massachusetts, have invented certain Improvements in Worker-Cylinders for Machines for Pulling, Tearing, or Picking Cop-Waste and other Fibrous Materials, of which the following is a specification.

The worker-cylinders of machines for pulling, tearing, or picking cop-waste and other fibrous materials as heretofore constructed have consisted of a wooden cylinder provided with rows of pointed teeth inserted therein by driving them into holes or mortises made for their reception. Cylinders so made are, however, objectionable, for the reason that the severe strain to which they are subjected soon causes the wood to split when the teeth become loose and fall out, rendering the cylinder inoperative and of no further use.

To obviate this difficulty and to produce a strong and durable worker-cylinder having teeth which can be readily removed and replaced when worn out or injured is the object of my invention, which consists in a worker-cylinder comprising a cylindrical core having a series of removable rings fitted thereupon, removable teeth arranged between said rings, and means for securely holding said teeth in place, as hereinafter described; and my invention furthermore consists in certain novel features and details of construction, as hereinafter described, and specifically pointed out in the claims.

In the accompanying drawings, Figure 1 is a side elevation of a worker-cylinder constructed in accordance with my invention. Fig. 2 is a central longitudinal section of the same. Fig. 3 is a transverse vertical section on the line 3 3 of Fig. 1. Fig. 4 is a perspective view of one of the rings which form the outside of the cylinder. Fig. 5 is a plan view of the same, showing its opposite side. Fig. 6 is an enlarged view of one of the picker-teeth. Figs. 7 and 8 are views of fragments of rings, showing different means for securely locking the teeth in place between the rings. Fig. 9 is a section on the line 9 9 of Fig. 8.

Referring to the drawings, A represents a cylindrical core, preferably composed of a metal tube or shell provided at its ends with heads 10, centrally through which passes a shaft 12, the ends of which form suitable journals for supporting the cylinder. Upon this core A are snugly fitted in close contact with each other a series of narrow removable rings B, the two end rings being interiorly threaded to fit correspondingly-threaded portions 15 16 at the opposite ends of the core A, the ring at the right-hand end of the cylinder being adapted to be turned by a suitable wrench applied to holes a, whereby it may be screwed up against the next ring in order to tightly clamp the entire series in contact with each other upon the core, said rings, except the one at the right-hand end of the cylinder, being prevented from turning independently of the core by a longitudinal key 18, fitting a groove or keyway 19 in the core, and a corresponding slot or groove 20 in each of the rings B, with the exception of the screw-threaded one at the right-hand end of the cylinder, which, as before stated, is used to clamp the rings tightly together. Between the rings B are placed a series of removable radially-arranged pointed picker-teeth C of curved or other suitable shape, each tooth being placed within a radial groove 21, formed in one of the side faces of the ring to which it is applied, as shown particularly in Figs. 3 and 4, with its base preferably resting against the core A, the depth of the grooves 21 being equal to the thickness of the teeth, so that the latter may lie flush with the surface of the ring.

Each ring B is provided on one side with an annular bead or projection 22 and on the opposite side with an annular groove 23, of less depth than the radial groove 21, for the reception of the annular bead or projection 22 on the opposing face of the adjoining ring, said bead entering a notch or groove 24 in each of the teeth C, lying within the several grooves 21 of the ring, whereby said teeth are securely locked in place, so that it will be impossible for them to be withdrawn or become loosened until the two rings between which they are held are separated from each other, which can be readily accomplished when a tooth becomes worn out or injured and requires to be replaced, it being merely necessary to unscrew and remove the ring at the right-hand end of the cylinder and lift off the rings until the desired tooth or teeth are reached, after which new teeth can be inserted and the rings replaced and clamped together as before.

I do not wish to limit myself to the means above described for locking the teeth in place within the radial grooves 21 of the rings B, as other modes of fastening and locking the teeth in place may be employed without departing from the spirit of my invention. In Figs. 8 and 9 is shown a tooth having a beveled head or shoulder 25 at its base, which is adapted to fit a correspondingly-shaped recess 26 at the inner end of the groove 21 of the ring B, within which it is placed, and in Fig. 7 is shown a tooth having a hole 27 for the reception of a pin 28, projecting up from the bottom of the groove 21, into which the tooth is fitted. These locking devices will both accomplish the desired end; but I prefer that first above described, as it is the simplest and easiest to construct.

What I claim as my invention, and desire to secure by Letters Patent, is—

1. In a cylinder of the character described, the combination with the core, of a series of removable rings mounted thereupon and keyed thereto, and forming the exterior of said cylinder, said rings being provided with radial grooves in their side faces, removable picker-teeth placed between said rings and within the radial grooves of the same, and means for locking said teeth in place within said radial grooves, consisting of an annular bead or projection formed on one face of each ring and adapted to fit within an annular groove in the opposing face of the adjoining ring, said annular bead entering a notch in each of the teeth lying within the radial grooves of the ring to which they are applied.

2. In a cylinder of the character described, the combination with a cylindrical core, of a series of removable rings mounted thereupon and keyed thereto, and provided with radial grooves in their side faces and with an annular bead or projection on one side and an annular groove on the opposite side, the two end rings being interiorly threaded and screwed upon the correspondingly-threaded ends of the core, removable picker-teeth placed within the radial grooves of said rings and each provided with a notch to receive the annular bead or projection of the adjoining ring, whereby said teeth are securely locked in place within said radial grooves.

Witness my hand this 24th day of April, A. D. 1905.

HENRY ALEXIS WILLIAMS.

In presence of—
P. E. TESCHEMACHER,
G. A. HIGGINS.